United States Patent [19]

Jones

[11] Patent Number: 4,881,661

[45] Date of Patent: Nov. 21, 1989

[54] WATER BOTTLE REFILL SYSTEM

[76] Inventor: Josh B. Jones, 3920 Delery Dr., Marrero, La. 70072

[21] Appl. No.: 177,424

[22] Filed: Apr. 1, 1988

[51] Int. Cl.[4] .......... G01F 23/10

[52] U.S. Cl. .......... 222/67; 222/185; 222/189

[58] Field of Search .......... 222/64, 67, 146.6, 185, 222/189, 190; 62/397

[56] References Cited

U.S. PATENT DOCUMENTS

| | | | |
|---|---|---|---|
| 1,351,302 | 8/1920 | Sanna | 222/67 X |
| 1,837,500 | 12/1931 | Sundeen | 222/185 |
| 2,675,145 | 4/1954 | Jacobs | 222/146.6 |
| 3,572,553 | 3/1971 | Ogden | 222/67 |
| 3,731,845 | 5/1973 | Booth | 222/67 |
| 3,921,855 | 11/1975 | Syverson | 222/67 |
| 3,966,093 | 6/1976 | Frahm et al. | 222/185 |
| 4,699,188 | 10/1987 | Baker | 222/146.6 |
| 4,723,688 | 2/1988 | Munoz | 222/146.6 |
| 4,757,921 | 7/1988 | Snowball | 222/146.6 |
| 4,779,426 | 10/1988 | De Srosiers | 222/146.6 |

FOREIGN PATENT DOCUMENTS 2038795 7/1980 United Kingdom .

*Primary Examiner*—Andres Kashnikow
*Assistant Examiner*—Patrick N. Burkhart
*Attorney, Agent, or Firm*—Calvin J. Laiche

[57] ABSTRACT

The present invention provides a water bottle refill system comprising a main frame bottle water stand having a water outlet; a water bottle adapted to invertedly mate with the stand and which is provided with an air vent and a purified water inlet at its top portion, flow of water through which is automatically regulated by virtue of a float valve mechanism mounted therein; and an "O" shaped sealing member adapted to seal the water bottle to the stand.

4 Claims, 1 Drawing Sheet

WATER BOTTLE REFILL SYSTEM

BACKGROUND OF THE INVENTION

The present invention pertains to water coolers or dispensers and the related arts. More specifically, the present invention provides a bottle water refill system which eliminates the necessity of continually replacing bottles of water in a water cooler or dispenser.

Conventional water coolers or dispensers comprise a source of bottled water which is inverted upon a main fram water stand which is provided with at least one spigot for dispensing water from the inverted bottle of water. Needless to say, this requires periodic replacement of the bottle of water which is quite heavy and clumsy to handle, especially since it must be opened first and then inverted upon the stand. Additionally, it requires storage of considerable numbers of bottles of water for an installation consuming a great deal of water, for example, a large office building employing numerous workers.

Considerable advances have been made in the purified water and related arts to provide a source of quality water from conventional water tap systems utilizing small compact water purifiers employing a carbon and/or reverse osmosis filtration system, or a combination of both. However, the public has been accustomed to associating the highest quality of water with conventional bottled waters derived from a source such as an artisan well spring or the like source, whereas, it can be clearly shown by qualitative analysis that conventional tap water from any source, and for that matter, from unpurified sources such as river, streams, and the like, can be treated by purification to render a higher quality water product than that obtainable from said former sources. Again though, people have been conditioned to feel that any source of water from a bottled water cooler is of higher quality than conventional tap water, such as provided through a city drinking water system.

The present invention overcomes the above prior art problems by providing a bottled water look alike stand; however, provides a water source of much higher and consistent quality by virtue of providing a source of purified water in combination with the present bottle refill system design.

Among the many advantages and features of the present invention is the fact that it is simply constructed and provides a continuous source of high quality water at much less unit cost. Moreover, it dispenses with the necessity of storing additional bottles of water and the handling difficulty of installing such bottles of water upon a water stand.

The above together with other features and advantages of the instant invention will be apparent to one skilled in the art in light of the details of construction and operation of the present water bottle refill system as shown in the drawing and described in the ensuing detailed disclosure of the preferred embodiment(s) which is particularly pointed out in the appended claims.

In short the new invention allows a constant supply of purified water by automatically refilling the five gallon bottle as water is used from the bottle. The internal float allows the filtered and purified water to enter the bottle thereby replenishing it. The newly invented device has a vent port in the bottle which allows air to move in and out of the bottle displacing the water that is drawn from the system and then replaced.

DESCRIPTION OF THE DRAWING

For a better understanding of the nature of the objects of the invention, reference should be made to the following drawing taken in conjunction with the detailed description thereof. In the drawing, reference numbers are employed consistently in the various views to refer to the identical components.

DESCRIPTION OF THE PREFERRED EMBODIMENT(S)

Figure 1:
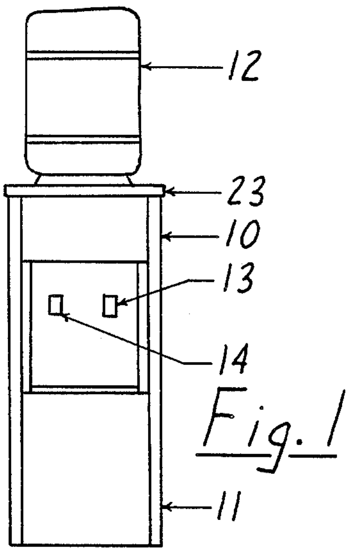
FIG. 1 in the drawing represents a front elevational view of a conventional bottled water stand which can be adapted to accommodate the present bottled water automatic refill system.

Referring to FIG. 1 of the drawing, the conventional bottled water cooler 10 comprises a lower frame member 11 which serves as a storage container for various well known appurtenances of a conventional cooler, such as connectors, conduits chilling mechanism (not shown) which are connected in series between the water bottle 12 positioned on top of the stand 11 to the spigot means 13 and 14. In that particular embodiment, such coolers are provided with two spigots generally to give a source of chilled water and hot water. In the latter instance, a heating apparatus would be included within the stand 11 connected in the conduit of the water bottle 12. Such bottled water coolers including many variations are old and well known in the art.

Figure 3:
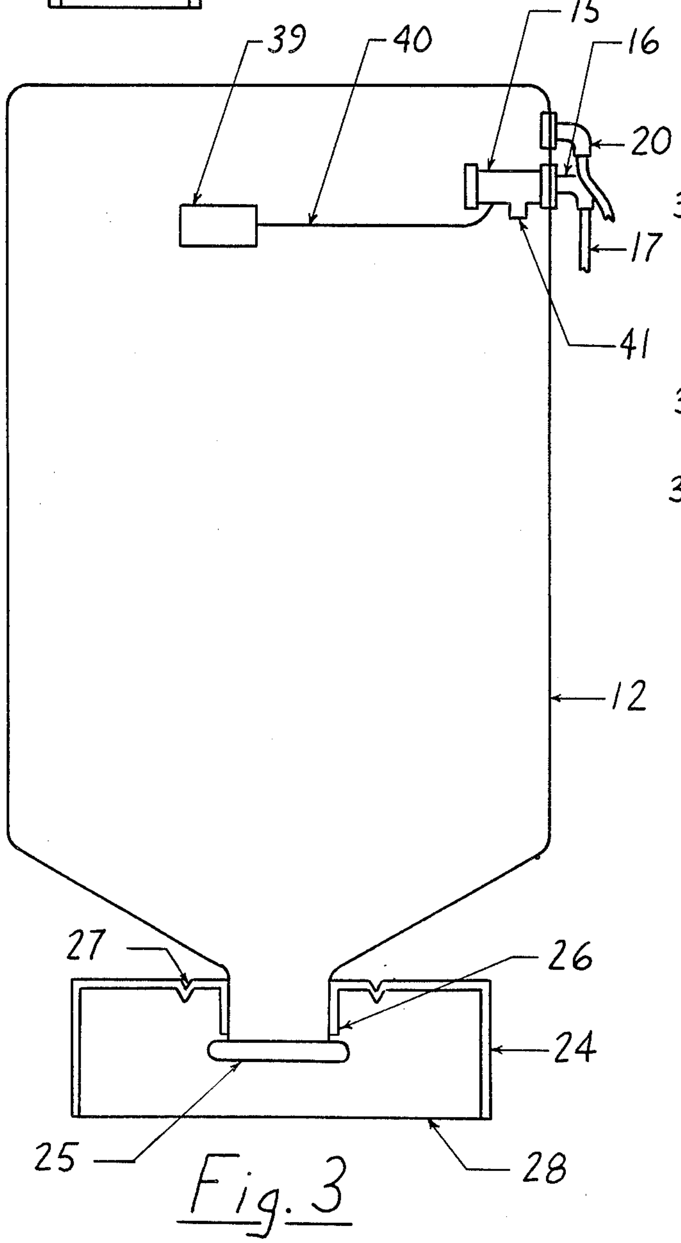
FIG. 3 in the drawing is a cut-away sectional view of preferred embodiments of the present system components.

Referring simultaneously to both FIGS. 1 and 3 of the drawing, the present invention provides a bottled water automatic refill system that can be adapted to most existing bottled water coolers and in its preferred design, comprises the five gallon plastic bottle 12 which in turn is further defined as comprising the conventionally operated float valve means 15 which is attached inside of the water bottle 12. The float valve 15 is attached thereto via a bulk head tubing fitting 16 which protrudes through the side wall of the five gallon water bottle 12. The tubing fitting or adapter 16 provides for connecting the float mechanism to a purified water supply via the conduit means 17.

The five gallon water bottle 12 also has an additional tubing bulkhead fitting 20 protruding through the rear wall portion of the five gallon bottle 12 to allow connection to the sub-micron air vent filter means 21. The latter mechanism allows the displacement of trapped air inside of the bottle 12 as the bottle fills and empties. In other words, as the bottle 12 is filled with water, air trapped in the bottle will be discharged through the filter. Conversely, as water is emptied from the bottle, suction produced on the bottle will be alleviated by air passing through the filter member 21 which in turn flows through the conduit member 22 connecting the member 21 to the bulk head fitting 20. In such manner, air entering the bottle 12 is purified. To say it another way, the conduit 22 allows the bottle to breath and the filter member 21 scrubs air entering the container 12 at any given time as it breaths. The purpose of the sub-micron rated air filter 21 is to assure that no air borne bacteria will enter the bottle that could possibly contaminate the purified water.

The five gallon bottle 12 is sealed to the base 23 of the water cooler 10 by virtue of the flexible rubber boot/gasket means 24. As well recognized in the bottled water cooler art, an inner container or sump is positioned immediately below the base 23. In a conventional bottle water cooler, as water is drawn from either of the spigots 13 or 14, water exits from the container 12 into the upper tank (not shown) of the cooler; however, the tank does not flow due to the faccum created within the water bottle 12 even though the tank is opened to the atmosphere. However, in the present system, as the water bottle 12 is allowed to breath, then the present design of water bottle 12 as shown in FIG. 3 of the drawing must be sealed to the tank. The flexible rubber boot or gasket 24 accomplishes this purpose by sealing the neck 25 of the five gallon water bottle 12 to the upper tank (not shown) of the water cooler 10. This is accomplished by providing the member 24 with the elongated flexible constricted portion 26 which is adapted to fit over the neck portion 25 of bottle 12 in a very snug and tight relationship. The member 24 is bellowed by virtue of the convulotions 27 which in turns allows the top portion of the member 24 to fit in various different positions relative to the top of the water container 12 which may vary in design according to its manufacturer as well as provide for the member 24 to accommodate the different design and position of the water hold-up tank (not shown) to which it is likewise connected along its bottom portion 28 which bayonets over the top portion of the tank, thus sealing the tank to the container 12. To assure a water and air tight fit, a worm gear type clamp is fitted over the outer peripheral surface of the gasket means 24 at its lower end 28.

Conversely, the top most portion of the gasket means 24 is sealed to the water container 12 by virtue of a similar type of clamp or device being mounted circumferentially around the inner lower neck portion 26 of the member 24.

The built in bellows 27 also allows for temporary expansion and contraction as water is drawn from the container 12 via, for example, the spigot 13. The rubber boot/gasket means 24 also allows the bottle to be easily removed for servicing should it become necessary or should sterilization of the bottle be desired in the event the water purification system malfunctions or contaminates enter the system.

Figure 2:
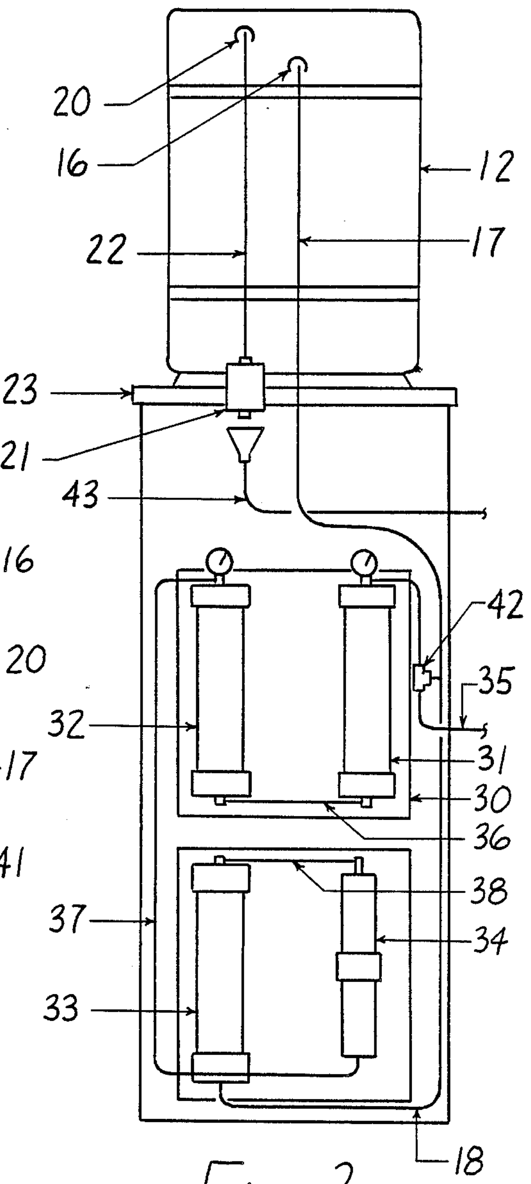
FIG. 2 of the drawing represents a rear elevational view of the conventional bottled water stand of FIG. 1 showing how it is adapted pursuant to the present invention.

FIG. 2 of the drawing illustrates a particularly preferred embodiment of the present invention incorporating a small reverse osmosis purification system 30 which in turn is further defined as comprising the series of conventional water filtering members 31, 32, and 33 which function in combination with the reverse osmosis filter 34. In such a system, water from, such a conventional tap water source 35 is fed in series through the filter members 31 and 32 via the connecting conduit 36 and 37 to the reverse osmosis unit 34 which in turn is connected via the conduit 38 to the filter member 33 from which a source of high purified water exits and flows through the conduit 17 into the water bottle 12 by virtue of the float means 15, which operates in a conventional fashion by virtue of the leverage action of the buoyant float member 39 operably connected to the main frame portion of the float member 15 by virtue of the elongated connecting means 40 which is hinged to provide articulate motion relative to the main from body of the float mechanism 15 and is operably connected to a plunger mechanism (not shown) positioned therein which includes a conventional valve stem or piston member that is cause to reciprocate against a seated opening therein so as to seal said opening when the buoyant member 13 is in an uprised position. Conversely, when the member 39 is allowed to deflect downward, water enters the container 12 by virtue of the float valve opening 41.

When the float valve means 15 is sealed, pressure increases in the conduit 17, which pressure level is reflected in the flow control member 42 shown in FIG. 2 of the drawing which in turn causes flow from the water source 35 to be interupted through the first filter member 31.

The over flow line 43 is provided for catching any moisture that may flow through the sub-micron filter member 21.

It will be obvious to one skilled in the art that many different modifications can be made in the present design of bottled water automatic refill systems without departing from its true scope and spirit. Therefore, what I intend to encompass within the ambit of my invention is that as set forth and particularly pointed out in the appended claims.

I claim:

1. An inverted water bottle dispenser means, said dispenser means having a main frame stand provided with at least one spigot operably connected to an inverted water bottle, said water bottle positioned on said main frame stand by converting the dispenser means from a single batch water source to a continuous source, a water tight convoluted flexible sealing means between a neck of the inverted water bottle and the main frame stand, the water bottle being provided with vent means and operably connected to water flow control means adapted for connection to a continuous source of purified water to be supplied to the bottle wherein said water tight convoluted flexible sealing means comprises a circular member having an inner neck portion adapted for being positively sealed to the neck of the inverted water bottle, and an outer bottom portion adapted for being positively sealed to the main frame stand, the member being further defined as comprising a flexible bellows portion operably connecting said inner neck portion to said outer bottom portion.

2. The dispenser means of claim 1 further defined in that air filter means is operably connected in series with the bottle vent means.

3. The dispenser means of claim 1 further defined in that water purification means is operably mounted upon the main frame means and is also operably connected to the water flow control means.

4. The dispenser means of claim 3 further defined in that the water purification means comprises a reverse osmosis and carbon filtration system.

* * * * *